Patented June 16, 1942

2,286,390

UNITED STATES PATENT OFFICE 2,286,390

PHENOXYACYLAMINO DERIVATIVES

Chiles E. Sparks, Wilmington, Del., assignor to E. I. du Pont de Nemours & Company, Wilmington, Del., a corporation of Delaware No Drawing. Application November 13, 1939, Serial No. 304,161

10 Claims. (Cl. 260—558)

This invention relates to new chemical compounds having the general formula

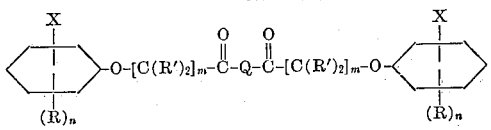

in which each R is one or any combination of the group consisting of hydrogen, straight and branched chain alkyl groups having 1 to 4 carbons, the corresponding alkoxy groups and halogen; $n$ is 1 to 2; each $[C(R')_2]_m$ group is one of a group consisting of straight and branched chain alkyl groups having 1 to 4 carbons; $m$ is 1 to 2; each X is nitro or amino and they may be in the ortho, meta or para position to oxygen. The symbol Q represents a radical of the group consisting of the polymethylene diamines having 2 to 10 methylene groups and straight and branched chain alkyl derivatives thereof in which alkyl has 1 to 3 carbons and is substituted in the methylene groups once to twice the number of methylene groups, a radical of the diamino-cycloalkane series having 3 to 6 carbons in the ring and ring substituted straight and branched chain alkyl derivatives thereof in which alkyl has 1 to 3 carbons and is present once to two less than the number of carbons in the ring, and a radical of the diazacycloalkane series having 4 to 5 carbons in the ring and the straight and branched chain alkyl derivatives thereof in which alkyl has 1 to 3 carbons and is substituted in the ring carbons once to twice the number of carbons in the ring. In the above formula when a carbon is substituted more than once the substituents may be like or unlike groups of the kinds described.

It is among the objects of the invention to provide new phenoxyacylamino derivatives of the benzene series which are indicated by the foregoing formula. Another object is to provide new diamino derivatives which are useful compounds, such as intermediates for the production of azo dyes. Other objects of the invention will be apparent from the following description.

The objects of the invention are attained in general by condensing nitro acyl halides of the type

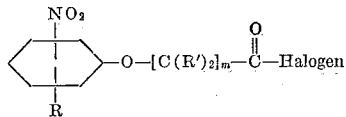

with a diamino straight chain, branched chain or cyclo alkane or with a diazacycloalkane having the radical represented by Q. Di(nitro phenoxyacyl)-diamino alkanes, -diamino-cycloalkanes and -diazacycloalkanes are thus formed. The corresponding diamino derivatives of these compounds are then made by reducing the nitro groups of the benzene rings.

The invention will be more fully set forth in the following more detailed description which includes examples that are given as illustrative embodiments of the invention and not as limitations thereof. Parts are expressed in parts by weight.

Example 1

A mixture of approximately 665 parts ethylene dichloride and 130 parts of 4-nitrophenoxyacetyl chloride was warmed to 70° C. and stirred to complete solution. The solution was cooled to 20° C. and slowly added to a solution composed of 15 parts of ethylene diamine, 26 parts of sodium hydroxide and 210 parts of water. The latter mixture was then stirred 3 hours whilst maintaining it alkaline to phenolphthalein and at a temperature of 10° to 20° C. A slurry which was formed was filtered and the filter cake was first washed with 300 parts of water at 20° C. and then with 200 parts of water which was made distinctly acid to Congo red paper with hydrochloric acid. The washed cake was dried in an air drier at 65° C. The product having a melting point of 214°–217° C. was 1,2-di(4'-nitrophenoxyacetylamino) ethane and is represented by the formula

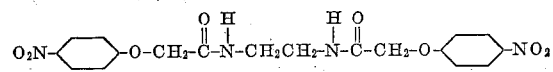

The 1,2-di(4'-aminophenoxyacetylamino) ethane was made by charging 155 parts of the above described compound, 15 parts of nickel catalyst composed of reduced nickel supported on an inert material and 245 parts of methanol into a closed autoclave, flushing out the air with hydrogen gas, heating to 90° C. and stirring under a gauge pressure of 500 pounds per square inch until no more hydrogen was absorbed. The mixture was then agitated one-half hour at 90° C. and then cooled to 20°–30° C. The mixture was then washed from the autoclave with water. Hydrochloric acid was added to make the mixture acid to Congo red paper and the amine was dissolved upon stirring. The solution of the amine was separated from the solids by filtration and the solution was made alkaline to phenolphthalein by adding ammonia. The 1,2-di(4'-aminophenoxyacetylamino) ethane which precipitated was washed with 200 parts of a water solution containing 1% sodium carbonate and 1% sodium hydrosulfite. The product was dried in a vacuum oven at 60° C. and was a white powder having a melting point of 176°–178° C. This product is represented by the formula

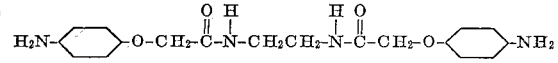

Example 2

By using an equivalent amount of the compound $NH_2-(CH_2)_6-NH_2$ instead of 15 parts of ethylene diamine in the process of Example 1 another dinitro and corresponding diamino product was produced. The diamino compound is represented by the formula

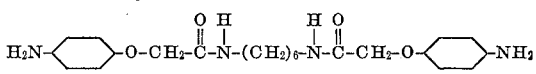

This product was of about 72% purity and its melting point was 200°–210° C.

*Example 3*

By using an equivalent amount of 4-nitro-2-methoxy-phenoxyacetyl chloride instead of 130 parts of 4-nitro-phenoxyacetyl chloride in Example 1, another dinitro and diamino derivative was produced. The diamino derivative is represented by the formula

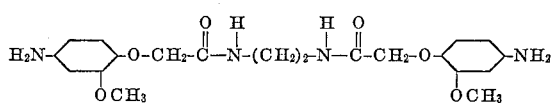

This product was of about 89% purity and its melting point was 215°–220° C.

*Example 4*

By using an equivalent amount of 3-nitrophenoxyacetyl chloride in Example 1 instead of 130 parts of 4-nitro-phenoxyacetyl chloride, the 1,2-di(3'-nitrophenoxyacetylamino) ethane and the 3'-amino compounds were produced. The amino compound is represented by the formula

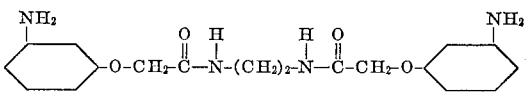

*Example 5*

By using an equivalent amount of 2-methyl-5-nitrophenoxyacetyl chloride instead of 130 parts of 4-nitrophenoxyacetyl chloride in the process of Example 1, the 1,2-di(2'-methyl-3'-nitrophenoxyacetylamino) ethane and the corresponding amino derivative were produced. The 1,2-di(2'-methyl-3'-amino-phenoxyacetylamino) ethane is represented by the formula

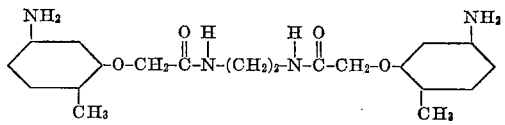

This product was of about 94% purity and its melting point was 195°–200° C.

*Example 6*

By using an equivalent amount of 2-chloro-4-nitro-phenoxyacetyl chloride instead of 130 parts of 4-nitro-phenoxyacetyl chloride in the process of Example 1, the 1,2-di(2'-chloro-4-nitrophenoxyacetylamino) ethane and the corresponding amino derivative were produced. The 1,2-di(2'-chloro-4'-amino-phenoxyacetylamino) ethane is represented by the formula

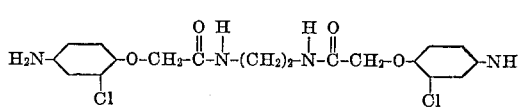

*Example 7*

By using an equivalent amount of 1:4-diaminocyclohexane instead of 15 parts of ethylene-diamine in the process for Example 1, the 1:4-di-(4'-nitro-phenoxy-acetylamino)-cyclohexane and the corresponding amino derivative were produced. The 1:4-di-(4'-amino-phenoxy-acetylamino)-cyclohexane is represented by the formula

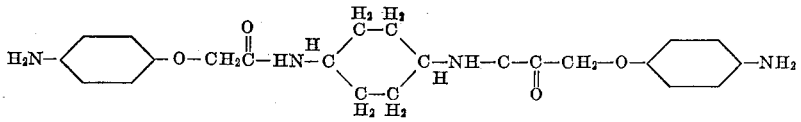

This product was of about 85.3% purity and had a melting point of 183° C. The corresponding nitro compound melted above 250° C. and had a purity of about 94.4%.

*Example 8*

By using an equivalent amount of piperazine instead of 15 parts of ethylene diamine in the process for Example 1, the di-(4'-nitro-phenoxyacetyl)-piperazine and the corresponding amino derivative were produced. The di-(4'-aminophenoxy-acetyl)-piperazine is represented by the formula

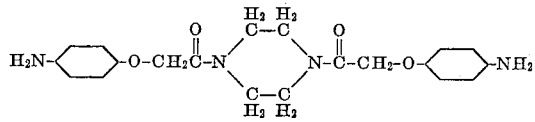

The product was of about 79.6% purity and had a melting point of 260° C. The corresponding nitro compound melted at 248° C. and had a purity of about 97.7%.

The term radicals of the polymethylene diamine series includes the series of straight and branched chain radicals derived by replacing a hydrogen from each of the amino groups of a polymethylene diamino of the kind described wherein each methylene carbon contains hydrogen atoms or one or two aliphatic groups which replace one or both of the hydrogens of the methylene group. In any —C(R')$_2$— group the branch groups may be alike or different when more than one alkyl substituent is present. For example a —C(R')$_2$— group may be a group such as

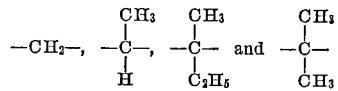

In like manner the groups R' may be straight or branched chain.

The series of diamino-cyclo-alkane compounds from which the diamino-cyclo-alkane radicals are derived by replacing one hydrogen in each of the amino groups have 4 to 6 carbons in the ring and these ring carbons may be substituted by R' as described. The R' substituents may be like or unlike groups. The series of diazacycloalkane radicals is derived in like manner from the series of diazacycloalkane compounds and the R' substituents of the ring carbons may be alike or different.

Any nitro acyl halide represented by the formula

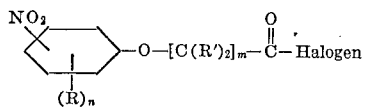

can be used instead of the nitrophenoxyacetyl chlorides used in the processes of the foregoing examples. As representative illustrations of such nitrophenoxyacylhalides are mentioned the 2- nitro-phenoxyacetylhalides, 2-nitro-4-methyl-phenoxyacetyl chloride, 4-nitro-phenoxypropionyl chloride, the corresponding isopropionyl halides, 4-nitrophenoxyacetyl bromide, 2,4-dimethyl-5-nitro-phenoxyacetyl chloride, 2,4-dichloro-6-nitro-phenoxyacetyl chloride, beta-(2'-ethoxy-4'-nitro-phenoxy)-butyryl chloride, alpha-(2-isopropyl-5-nitro-phenoxy)-valeryl chloride and alpha-(2,4-dipropyl-5-nitro-phenoxy)-propionyl chloride.

Typical illustrations of diamino and di-imino compounds of the described class are 1,10-diamino normal decane, 1,10-diamino-eicosamethyl-n-decane, 1,2-diamino-tetra methyl-ethane, 1,3-diamino-2-isopropyl-propane, 1,2-diamino-1-propyl-propane, 1,4-diamino-(1,3-dimethyl)-butane, 1,4-diamino-cyclohexane, 2,5-dimethyl piperazine, the methyl substituted 1,4-diamino-cyclohexanes, 3,5-dimethyl-pyrazolidine and bis-trimethylene-diamine. By suitably reacting in the manner described any of the nitro phenoxy acyl halides of the described class with any of the described class of diamino and diazo compounds, the products of the invention may be produced. The nitro groups of the products may then be reduced by suitable and well known methods to yield the described diamino phenoxy derivatives.

Typical illustrations of other products of the invention which may be derived in the described manner are mentioned 1,3-di-[alpha-(4'-amino-2'-isopropoxy-phenoxy)-butyryl-amino]-propane and the corresponding 4'-nitro derivative, 1,2-di-(3'-amino-6'-isobutyl-phenoxy-acetylamino)-butane and the corresponding 3'-nitro derivative, and the ethane, propane, butane, isobutane, decane and the like compounds and derivatives thereof of the classes indicated.

The preferred embodiments of the invention are those which are derived from the nitro-phenoxyacetyl halides and are represented generally by the formula

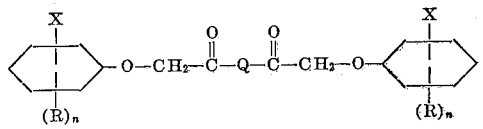

and of these compounds those in which X is meta or para to oxygen, preferably para, and Q is —HN(CH₂)₂—NH—, —HN(CH₂)₆—NH— or the radical of piperazine are preferred.

Any inert organic solvent can be used as the medium in which to carry out the reaction of the nitrophenoxy acid halides with the diamino or di-imino compounds. By the term, inert organic solvent is meant any organic solvent which is a solvent for both the nitrophenoxy acid halide and the diamino or di-imino compound and which is not reacted upon by the basic condensation agent at condensation temperatures so as to combine with the desired products or form undesired products. As illustrations of the many useful inert organic solvents besides ethylene dichloride are mentioned chloro benzene, orthodichloro benzene, chloroform, carbon tetrachloride and benzene. The temperature, pressure, solvents, the alkalinity and concentration of the reaction medium and the rate of carrying out the reaction can be varied within broad limits to suit the reactants and other desired conditions. The hydroxide of any of the alkali metals can be used as the condensation agent instead of sodium hydroxide, and its concentration can be varied. Such modifications will be readily suggested to those skilled in the art.

Various similar modifications can also be made in the catalytic reduction of the dinitro compounds, such as the inert solvent, temperature, pressure of hydrogen, duration and rate of hydrogenation and the catalyst. Any nickel hydrogenation catalyst can be used. In general, the preferred forms comprise nickel which has been reduced from a salt thereof and which is carried on an inert support. While the catalytic reduction of the nitro compounds is generally preferred, any method of selectively reducing the nitro groups can be used, such as the reduction with metal powders, such as iron in a slurry which is acidified with a non-oxidizing acid or reduction in alkaline medium with ammonium or alkali metal hydrosulfides, sulfides, disulfides or polysulfides.

The new compounds are useful as intermediates for the manufacture of dyes and for other purposes. The diamino derivatives can be tetrazotized and coupled with suitable azo dye coupling components to form direct azo dyes for cotton which have better light fastness and brighter shades than direct azo dyes which are made with like coupling components and contain as the azo component the radical of

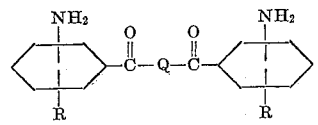

For example the dye represented by the formula

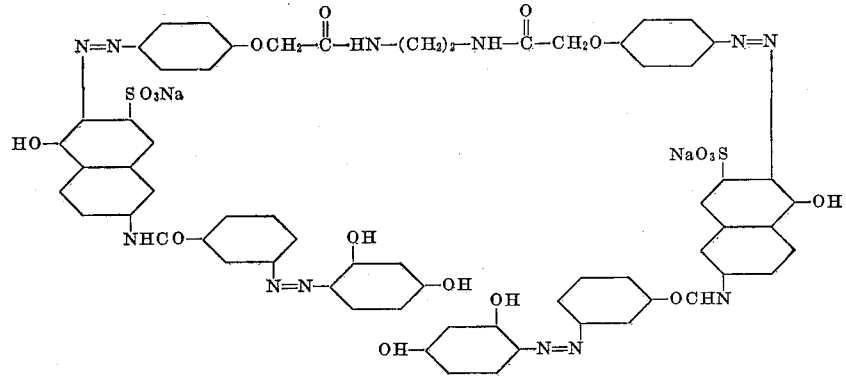

is a direct dye for cotton and brighter dyeings and dyeings with better light fastness are made with this dye than with the dye having the same components except that the bridging radical is

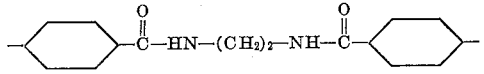

From the foregoing disclosure it will be recognized that the invention is susceptible of modification without departing from the spirit and scope thereof and it is to be understood that the invention is not restricted to the specific illustrations thereof herein set forth.

I claim:
1. The compounds represented by the formula

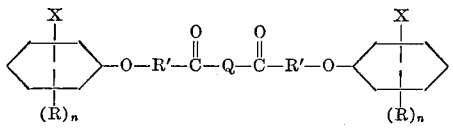

in which each R is from a group consisting of hydrogen, straight and branched chain acyclic alkyl having one to four carbons, the corresponding alkoxy groups, and halogen; n is 1 to 2; each X is one of a group consisting of nitro and amino; each R' is from a group consisting of straight and branched chain alkyl groups having 1 to 4 carbons; and Q represents a radical of the group consisting of polymethylene diamine radicals having 2 to 10 methylene groups and straight and branched chain alkyl derivatives thereof in which the substituted groups are straight and branched chain alkyl groups having 1 to 3 carbons and in which the substituted groups occur once to twice the number of methylene groups, radicals of the diamino-cyclo-alkane series having 3 to 6 carbons in the ring and ring substituted straight and branched chain alkyl derivatives thereof in which the substituted groups have 1 to 3 carbons and are present once to two less than the number of carbons in the ring and radicals of the diazacycloalkane series having 3 to 4 carbons in the ring and the straight and branched chain alkyl derivatives thereof in which the substituted groups have 1 to 3 carbons and are substituted in the ring once to twice the number of carbons in the ring.

2. The compounds represented by the formula

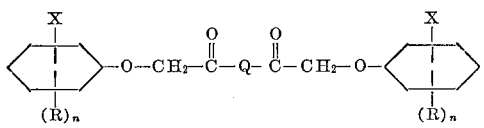

in which R is from a group consisting of hydrogen, straight and branched chain acyclic alkyl having 1 to 4 carbons, the corresponding alkoxy groups and halogen; n is 1 to 2; each X is one of a group consisting of nitro and amino; Q represents a radical of the group consisting of polymethylene diamine radicals having 2 to 10 methylene groups and straight and branched chain alkyl derivatives thereof in which alkyl has 1 to 3 carbons and is substituted in the methylene groups once to twice the number of methylene groups, radicals of the diamino-cyclo-alkane series having 3 to 6 carbons in the ring and ring substituted straight and branched chain alkyl derivatives thereof in which alkyl has 1 to 3 carbons and is present once to two less than the number of carbons in the ring and radicals of the diazacycloalkane series having 3 to 4 carbons in the ring and the straight and branched chain alkyl derivatives thereof in which alkyl has 1 to 3 carbons and is substituted in the ring once to twice the number of carbons in the ring.

3. The compounds represented by the formula

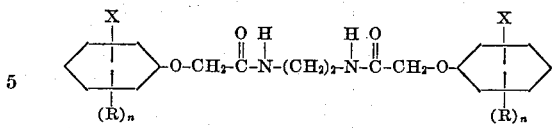

in which each R is from the group consisting of hydrogen, straight and branched chain acyclic alkyl having 1 to 4 carbons, the corresponding alkoxy groups and halogen; n is 1 to 2; and each X is one of a group consisting of nitro and amino.

4. The compounds represented by the formula

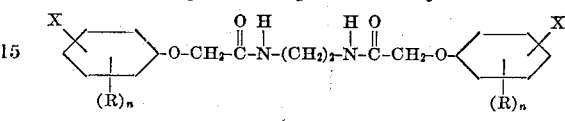

in which each X is one of a group consisting of nitro and amino and is in one of the positions meta and para to oxygen, and each R is from a group consisting of hydrogen, straight and branched chain acyclic alkyl having 1 to 4 carbons, the corresponding alkoxy groups and halogen; and n is 1 to 2.

5. The compounds represented by the formula

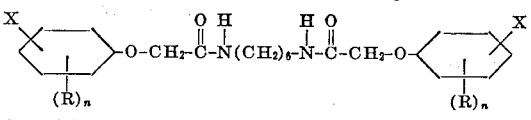

in which X is one of a group consisting of nitro and amino and is in one of the positions meta and para to oxygen; each R is from a group consisting of hydrogen, straight and branched chain alkyl having 1 to 4 carbons, the corresponding alkoxy groups and halogen; and $n$ is 1 to 2.

6. The compounds represented by the formula

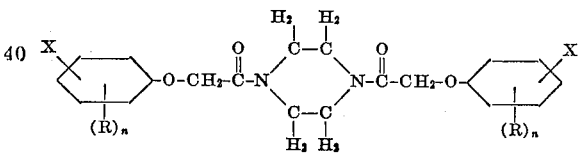

in which each X is one of a group consisting of nitro and amino and is in one of the positions meta and para to oxygen; R is from the group consisting of hydrogen, straight and branched chain alkyl having 1 to 4 carbons, the corresponding alkoxy groups and halogen; and $n$ is 1 to 2.

7. The compounds represented by the formula

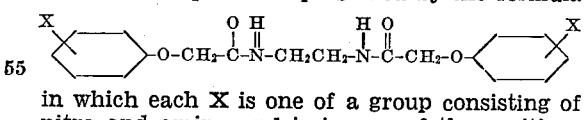

in which each X is one of a group consisting of nitro and amino and is in one of the positions meta and para to oxygen.

8. The compound represented by the formula

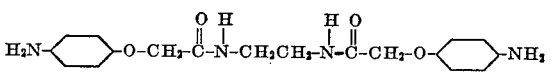

9. The compound represented by the formula

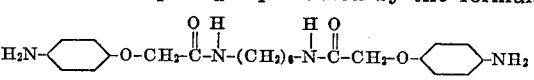

10. The compound represented by the formula

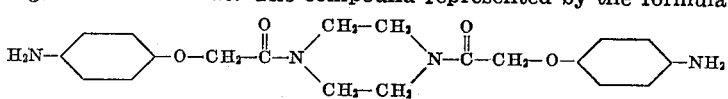

CHILES E. SPARKS.

Certificate of Correction

Patent No. 2,286,390.   June 16, 1942.

CHILES E. SPARKS

It is hereby certified that errors appear in the printed specification of the above numbered patent requiring correction as follows: Page 4, first column, line 47, claim 2, before "R" insert the word *each*; and second column, line 28, claim 5, for that portion of the formula reading "N(CH₂)₆" read N–(CH₂)₆; line 55, claim 7, in the formula for read

and that the said Letters Patent should be read with these corrections therein that the same may conform to the record of the case in the Patent Office.

Signed and sealed this 28th day of July, A. D. 1942.

[SEAL]

HENRY VAN ARSDALE,
*Acting Commissioner of Patents.*